United States Patent Office 3,572,986
Patented Mar. 30, 1971

3,572,986
PROCESS FOR THE DYEING AND PRINTING OF POLYAMIDE FIBERS USING CYCLOHEXYL AMINO ANTHRAQUINONES
Gunter Gehrke, Cologne-Flittard, Germany, assignor to Farbenfabriken Bayer Aktiengesellschaft, Leverkusen, Germany
No Drawing. Filed July 18, 1968, Ser. No. 745,716
Claims priority, application Germany, July 27, 1967,
F 53,073
Int. Cl. C09d 1/50; D06p 1/20
U.S. Cl. 8—39               2 Claims

ABSTRACT OF THE DISCLOSURE

The process for dyeing and printing polyamides characterized by using 1-amino-2-alkoxy or substituted alkoxy-4-cyclohexyl amino anthraquinone whereby the dyeings are characterized by very good fastness properties.

---

It has been found that intense violet dyeings or prints of very good fastness properties are obtained on polyamide fibres or fabrics with dyestuffs of the Formula I

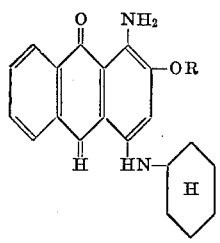

in which R stands for an alkyl radical which may be substituted by hydroxy, alkoxy, hydroxyalkoxy or alkoxyalkoxy groups and contains 1–6 carbon atoms in all.

Dyeing or printing is carried out by the methods customarily used for disperse dyestuffs on polyamide fibres or fabrics. It is advantageous to bring the dyestuffs into a finely divided state by conventional methods, for example, by grinding or kneading in the presence of dispersing agents. The usual dyeing or printing auxilaries can be added to the dyeing or printing process.

The dyestuffs according to the invention can be prepared according to known processes, for example, by reacting anthraquinone derivatives which contain a sulphonic acid group in the 2-position, with alcohols in the presence of alkali, as described in German patent specifications Nos. 521,382 and 541,637. In these specifications it is also stated that the compounds are suitable for dyeing acetate rayon. Whereas dyestuffs containing a hydroxy or amino group in the 4-position draw well on acetate rayon and have been widely marketed as dyestuffs for acetate rayon (cf. Colour Index, Disperse Red 4 and 11), dyestuffs containing a cyclohexylamino group in the 4-position, draw poorly on acetate rayon and have hitherto not achieved any importance. It was therefore surprising that these dyestuffs yield intense dyeings of very good fastness properties on polyamide fibres under the usual dyeing conditions, and that a depth of colour can be achieved, which is about 6 to 8 times that of the maximum depth of colour obtainable on acetate rayon.

EXAMPLE 1

100 parts of fibre material of polyamide are dyed in 4000 parts of water at 95 to 98° C. for one hour with 4 parts of a 30% dyestuff powder which has been prepared by grinding 1 - amino-2-(β-hydroxyethoxy)-4-cyclohexyl-amino-anthraquinone with a condensation product of naphthalene-sulphonic acid and formaldehyde as dispersing agent. After rinsing and drying, there is obtained an intense, brilliant violet dyeing of very good fastness to light.

EXAMPLE 2

A precleaned and thermofixed polyamide fabric is printed with a printing paste prepared according to the following instruction:

30 g. of the dyestuff of Example 1 are pasted with
50 g. of thiodiglycol, dispersed in
400 g. of hot water and stirred into
500 g. of a crystal gum thickening agent.
20 g. of printer's oil serving as anti-foaming agent are then added with stirring.

After printing and drying, the prints are fixed in a continuous or star steamer without excess pressure for 15–20 minutes, subsequently rinsed, soaped, rinsed again and dried. A brilliant violet print of very good fastness to light is obtained.

EXAMPLES 3–14

When the 1-amino-2-(β-hydroxy-ethoxy)-4-cyclohexyl-amino-anthraquinone is replaced in Example 1 or 2 with the dyestuffs compiled in the following table, violet dyeings or prints of similar fastness properties are also obtained.

The dyestuffs correspond to the formula

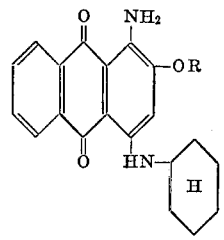

and R has the following meaning:

(3) $R=CH_3$
(4) $R=CH_2-CH_3$
(5) $R=CH_2-CH_2-CH_3$
(6) $R=CH_2-CH_2-CH_2-CH_3$
(7) $R=CH_2-CH_2-CH_2-OH$
(8) $R=CH_2-CH_2-CH_2-CH_2-OH$
(9) $R=CH_2-CH_2-CH_2-CH_2-CH_2-CH_2-OH$
(10) $R=CH_2-CH_2-OCH_3$
(11) $R=CH_2-CH_2-OCH_2-CH_3$
(12) $R=CH_2-CH_2-\underset{CH_3}{CH}-OCH_3$
(13) $R=CH_2-CH_2-OCH_2-CH_2-OH$
(14) $R=CH_2-CH_2-OCH_2-CH_2-OCH_2-CH_2$

What is claimed is:
1. Process for the dyeing or printing of polyamide fibers characterized by using dyestuffs of the formula

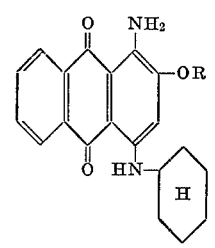

in which R stands for an alkyl radical which may be substituted by hydroxy, alkoxy, hydroxyalkoxy or alkoxyalkoxy groups and contains 1–6 carbon atoms in all.

2. Process according to claim 1 characterised by using the dyestuff of the formula

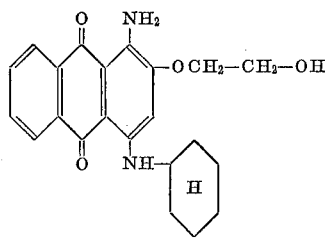

References Cited

FOREIGN PATENTS 541,637 1/1932 Germany.
23,899 12/1961 Japan _____ 260—380
374,442 2/1964 Switzerland _____ 260—380

CHARLES E. VAN HORN, Primary Examiner

P. C. IVES, Assistant Examiner

U.S. Cl. X.R.

260—380